United States Patent [19]

Frianeza-Kullberg et al.

[11] Patent Number: 4,859,343

[45] Date of Patent: Aug. 22, 1989

[54] SODIUM REMOVAL FROM BRINES

[75] Inventors: Teresita C. Frianeza-Kullberg; Darrish W. Barnette, both of Gastonia, N.C.

[73] Assignee: Lithium Corporation of America, Castonia, N.C.

[21] Appl. No.: 127,819

[22] Filed: Dec. 2, 1987

[51] Int. Cl.$^4$ .............................................. C02F 1/42
[52] U.S. Cl. .................................... 210/679; 210/681; 423/179.5; 423/181
[58] Field of Search ...................... 210/679, 681, 902; 423/181, 179.5

[56] References Cited

FOREIGN PATENT DOCUMENTS 45-22418  2/1970  Japan.
48-30000  2/1973  Japan.
52-6949   2/1977  Japan.

OTHER PUBLICATIONS

Abe, M.; Ito, T. "Cation Exchange Properties of Antimonic Acid," *J. Jpn. Chem.* 87: 11, 1174–1179 (1966).
Abe, M.; Ito, T. "Synthetic Inorganic Ion Exchange Materials. X. Preparation and Properties of So-Called Antimonic(V) Acid," *Bull. Chem. Soc. Jpn.* 41, pp. 333–342 (1968).
Abe, M. "Synthetic Inorganic Ion Exchange Materials. XVI. Chromatographic Separation of Microamounts of Sodium and Potassium from a Large Quantity of Lithium Chloride by Using Crystalline Antimonic(V) Acid as a Cation Exchanger," *Sepn. Sci. Tech.* 13:4, 347–365 (1978).
Abe, M. "Synthetic Inorganic Ion Exchange Materials XVII. A Study on Ion Exchange Selectivity in Crystalline Antimonic(V) Acid and Hydrated Antimony Pentoxide for Various Metal Ions in Nitric Acid Media,'-'*Sepn. Sci. Tech.* 15:1, 23–30 (1980).
Baetsle, L. H.; Huys, D. "Structure and Ion Exchange Characteristics of Polyantimonic Acid," *J. Inorg. Nucl. Chem.* 30, 639–649 (1968).
Girardi, F.; Sabbioni, E. "Selective Removal of Radio-Sodium from Neutron-Activated Materials by Retention on Hydrated Antimony Pentoxide," *J. Radioanal. Chem.*, 1, 169–178 (1968).
Abe, M.; Sudoh K., "Synthetic Inorganic Ion Exchange Materials, XXX. Ion Exchange Equilibria of Alkaline Earth Metal Ions and $Pb^{2+}$/Hydrogen Ions on Crystalline Antimonoic(V) Acid," *J. Inorg. Nucl. Chem.*, 43 No. 10, 2537–2542 (1981).
Abe, M. "Synthetic Inorganic Ion Exchange Materials, XVIII. Ion Exchange Equilibria of Crystalline Antimonic(V) Acid with Alkali Metal Ions," *J. Inorg. Nucl. Chem.* 41, 85–89 (1979).

*Primary Examiner*—Ivars Cintins
*Attorney, Agent, or Firm*—Charles C. Fellows; Eugene G. Seems

[57] ABSTRACT

A method for removing 99% of the sodium ions from a natural or industrial brine containing dissolved salts of metals of Group 1A of the periodic chart and in which brine sodium ions are not the predominant metal ions by contacting the brine at pH 11 to 12 with an ion exchanger selected from crystalline antimonic acid and polyantimonic acid, and removing from contact with the ion exchanger the brine with greater than 99% of the sodium ions removed.

13 Claims, No Drawings

SODIUM REMOVAL FROM BRINES

This invention concerns a process which removes 99% or more of the sodium ions from natural or industrial brines in which sodium ions are not the predominant ions using an inorganic crystalline antimonic acid or polyantimonic acid ion exchanger, an improved process for preparing crystalline antimonic acid, and a process for the preparation of supported antimonic acid.

There is a continuing need for and interest in producing special industrial chemicals and metals of very high purity. The need for low sodium lithium metal for battery applications requires a low sodium lithium chloride feed to the electrolytic cells used in producing lithium metal. The sodium content in lithium metal made from lithium chloride is about 50 ppm on a lithium metal basis. Although this is a low sodium concentration, battery metal users prefer very little or no sodium at all. Sodium of $\leq 2$ ppm in a highly concentrated lithium brine while desirable is difficult to achieve by conventional separation techniques, even by processes using ion exchange resins.

Presently, only antimonic acid ($Sb_2O_5 \cdot 4H_2O$) has shown an affinity for sodium in an ion exchange process. The preparation of antimonic acid was discussed in several patents by Mitsuo Abe and his co-workers. These are Japanese Pat. Nos. 45-22418, 48-30000, and 52-6949. Other published papers of significance are cited in the Journal of Japanese Chemistry, Vol. 87: 11, 1174-1179 (1966), which discusses the cationic properties of antimonic acid and in the Bulletin of the Chemical Society of Japan, Vol. 41, 333-342 (1968), which presents the preparation and properties of antimonic acid.

The preparation of crystalline antimonic acid, as described by Abe et al., is accomplished by hydrolysis of antimony pentachloride to obtain amorphous antimonic acid, then 0.1 to 6 mole/liter of the amorphous antimonic acid is made acidic with hydrochloric acid, nitric acid, or sulfuric acid, followed by curing or aging at temperatures above room temperature and under 70° C., isolating, washing, and drying the crystals. This is so stated in lines 24-35 of Japanese Pat. No. 45-22418.

In Japanese Pat. No. 48-30000, Example 1 describes an application of crystalline antimonic acid on the removal of sodium from lithium chloride in acid media (lines 39-45). Initial amounts of sodium and potassium impurities were not stated.

In a published article [Bulletin of the Chemical Society of Japan, Vol. 41, 333-342 (1968)], M. Abe states that the crystallization of the amorphous antimonic acid is facilitated by raising the temperature within a range of 0°-80° C. or by increasing the concentration of strong mineral acid on aging. X-ray powder data was given; lattice constant is 10.38A and space group is Fd3m. Selectivity sequence is $Li^+ < K^+ < Cs^+ < Rb^+ < Na^+$ for alkali metals and $Mg^2 < Ba^{2+} < Sr^{2+} < Ca^{2+}$ for alkaline earth metals.

In Section 3.3 of the article published in the Journal of Japanese Chemistry, Vol. 87:11, 1174-1179 (1966), M. Abe states that ". . . we suspected that if antimonic acid were placed in solutions of sodium hydroxide, potassium hydroxide, or lithium hydroxide, the sodium, potassium, or lithium ions would be adsorbed, and antimonate salts would be formed. We felt that since, generally, antimonate salts have a low degree of solubility, sodium antimonate $0.03^{12.8}$, potassium antimonate $2.8^{20}$, and lithium antimonate (unknown), by using highly concentrated solutions it might be possible to form these substances." On the concept that basic solutions form the alkali antimonates, M. Abe performed all tests at $pH = 3-4$.

In another paper [Journal of Inorganic and Nuclear Chemistry, Vol. 43:10, 2537-2542 (1981)], M. Abe specifically defines his solution pH working range for crystalline antimonic acid by stating: "A solution (pH=3-4) of 0.1M of each metal nitrate was charged continuously at the top of the crystalline antimonic acid (designated C-SbA, column in H+ form at a flow rate of about 1.5 ml/h until the difference in the concentration of the metal ion was negligible between the effluent and feed." Other published articles and patents by Abe do not give a pH value but describe "acidic" solutions. For instance, in Example 1 of Japanese Pat. No. 48-30000, Abe prepared a solution of lithium chloride containing sodium and potassium impurities, and 8 parts of concentrated hydrochloric acid was added to 200 parts of the solution in 400 parts of water prior to use. This solution is definitely in the lower acid pH range.

The preparation of polyantimonic acid, described by Baetsle and Huys in the Journal of Inorganic and Nuclear Chemistry, Vol. 30, 639-649 (1968), is accomplished by dissolving $K_2H_2Sb_2O_7$ in boiling water, adding an $HCl/NH_4Cl$ mixture to form the gel, then letting it stand overnight prior to filtration. The product is dried at 50° C. Its selectivity sequence is $Cs^+ < Rb^+ < NH_4^+ < K^+ < Na^+$ for alkali metals and $Mg^{2+} < Ca^{2+} < Sr^{2+} < Ba^{2+}$ for alkaline earth metals. The X-ray pattern of polyantimonic acid is similar to that reported by Abe, but d-spacings are shifted slightly downward.

Another method of preparation of antimonic acid, termed hydrated antimony pentoxide, is described by F. Girardi and E. Sabbioni in the Journal of Radioanalytical Chemistry, Vol. 1, 169-178 (1968). This sample was prepared also by the hydrolysis of $SbCl_5$ with water; however, the product was dried at 270° C. for five hours. It showed excellent removal of radio-sodium from neutron-activated materials.

Although Abe, his co-workers and others have extensively published articles and patents related to the use of crystalline antimonic acid and polyantimonic acid ion exchangers, a practical process has yet to be provided which will reduce sodium ions in natural and industrial brines to very low levels in a reasonable period of time by removal of most of the sodium. The present invention provides a process for the removal of at least 99% of the sodium ions from a natural or industrial brine in which the sodium ions are not the predominant ions. While Abe employed dilute acidic solutions, this process involves contacting the saturated brine at pH 11 to 12 with a crystalline antimonic acid or polyantimonic acid ion exchanger for a period of time sufficient to permit ion exchange to occur at a temperature between the freezing point and boiling point of the brine. Although ion exchange occurs over a wide temperature range (the boiling point may even be raised by increasing the pressure), low temperatures in the range of 10° C. to 80° C. are convenient operating temperatures for practicing this invention.

The term brine as used herein includes dilute to concentrated natural or industrial brines in which sodium ions are not the predominant ions. The word brine as used herein means a natural or industrial solution of a salt in water. The brine may be saturated, concentrated or dilute. The brines principally contain salts of metals of group 1A of the period chart and contain sodium ions as an undesired impurity. This process is applicable to removal of sodium ions from dilute to concentrated lithium chloride, lithium hydroxide, potassium chloride, rubidium chloride and cesium chloride brines.

The ion exchange process of this invention can be practiced over a wide temperature range, generally between the freezing point and boiling point of the brine. While rather high temperatures can be achieved by increasing the pressure above atmospheric to reach temperatures above 100° C., lower temperatures are preferred. Temperatures of 10° C. to 80° C. are preferred and 20° C. to 70° C. are most preferred. The solubility of crystalline antimonic acid is low, 1-2 ppm in water, and is controlled by decreasing agitation time and temperature and by increasing the crystallinity of the antimonic acid. Temperature effects show no significant improvement on the uptake of sodium from lithium chloride brines.

The process of the invention can be practiced by adding a given amount of the ion exchanger to the brine at pH 11 to 12. The brine-ion exchanger mixture in a batch process is usually agitated to effect contact and ion exchange. Generally after about one hour of contact, usually involving agitation, the brine is separated from the ion exchanger by conventional means and the ion exchanger recovered for regeneration and reuse. Depending on the amount of sodium in the brine and the amount of ion exchanger employed, the time can be varied between about an hour and twenty-four hours or more. Although 99% of the sodium ions can be removed in an hour, longer time periods can be employed as may suit operating conditions. Since ion exchange apparently proceeds according to the mass action law and since some exchange reactions are faster than others once the necessary time has been provided for ion exchange to occur, the brine treatment time can be extended but it is not necessary to do so. A slight excess of ion exchanger can be used to ensure optimum sodium removal.

The pH of most industrial and natural brines from which it may be desired to remove sodium ions do not usually have a pH of 11 to 12. The pH is therefore usually adjusted to a pH of 11 to 12 using a hydroxide of the predominant metal ion in the brine from which it is desired to remove sodium. In the case of a lithium chloride brine where the predominant ion is the lithium ion, the pH is adjusted with lithium hydroxide. The hydroxide employed should be of high purity so as not to introduce additional contaminants into the brine. Ammonium hydroxide can be used but the ammonia should be removed from the product brine.

The hydrolysis of antimony pentachloride first results in producing a gel. Heating the gelled antimonic acid starts crystallizing it and continued heating increases the regularity or more ordered structure of the crystals.

The ion exchanger used in the process of this invention is either crystalline antimonic acid or polyantimonic acid. The latter is available commercially and has a suitable particle size, while the former has been prepared previously in the laboratory by Abe et al. by aging the acidified gel for at least 7 days at room temperature. However, in this present invention, preparation of crystalline antimonic acid is achieved by the hydrolysis of antimony pentachloride with water, followed by continuous reflux without further acidification at about 105° C. for at least 24 hours, but preferably for up to 76 hours. Longer reflux periods, up to 7 days, may be used and are useful to increase the degree of crystallinity of the antimonic acid. X-ray powder diffraction studies show reflections corresponding to the formula $Sb_2O_5.4H_2O$. This pattern, when compared to those obtained by Abe on his antimonic acid both before and after being heat-treated at 100° C., shows reflections containing patterns similar to one or the other of these Abe materials. This indicates that the present reflux method for the preparation of crystalline antimonic acid is new and has not previously been described.

In another aspect of this invention, crystalline antimonic acid is synthesized on and/or within an ion exchange support material selected from an anion exchange resin, alumina, silica-alumina and zeolites. The process comprises impregnation of the support material with antimony (V) ions followed by precipitation of antimonic acid on the surface and/or within the bulk of the support by the addition of ammonia followed by refluxing for at least 24 hours to increase the crystallinity of the antimonic acid and the adherence of the antimonic acid to the support. This produces larger size ion exchanger particles which are considered more useful in a column.

The support materials useful in preparing supported crystalline antimonic acid include but are not limited to anion exchange resins such as Dowe TM MSA-1, Dowex TM MWA-1, Amberlite TM IRA-900 and the like, in either the chloride or hydroxide-form; gamma-aluminum oxide ($\gamma$-$Al_2O_3$) pellets or spheres and silicon oxide-aluminum oxide ($SiO_2$–$Al_2O_3$) pellets or spheres.

The support material is impregnated with an amount of antimony (V) pentachloride. The mixture is dried, generally at room temperature although higher temperatures can be used, with an inert gas, preferably argon gas. Concentrated ammonium hydroxide is added to the mixture to promote precipitation of the antimonic acid on the surface and within the bulk of the support material. Water is added with stirring and the mixture is refluxed for at least twenty-four hours or aged for at least ten days. Aging at room temperature, under elevated temperatures or at the reflux, increases the crystallinity of the antimonic acid and its adherence to the substrate. While 24 hours at reflux produces a useful product, about three days refluxing is preferred. The mixture is filtered to separate the solution from the solid, supported antimonic acid product. The particulate product is then dried; conveniently the product can be air dried at ambient temperatures, oven dried or by whatever technique is convenient and suits the operator.

The following examples further illustrate this aspect of the invention.

I SYNTHESIS OF ANTIMONIC ACID

A. COMPARISON EXAMPLE - Antimonic Acid Prep. I

Sixty-nine milliliters of distilled water was charged into a five liter three-neck flask equipped with agitator, thermocouple, water condenser, and an argon back bubbler. With agitation, 67 ml (156.5 g) of antimony pentachloride was slowly added (dropwise) into the reactor at room temperature. The reaction was very violent and exothermic. External cooling was not applied. A white precipitate formed but redissolved after approximately one-third of the antimony pentachloride charge had been added. After the antimony pentachloride addition was complete, sufficient distilled water was added until the reactor's volume was 4600 ml. A thick white precipitate formed after approximately 300 ml of distilled water had been added. With very slow agitation, the slurry was heated to and held at 40° C. for twelve days. The slurry was transferred into a five liter separatory funnel, where the precipitate was allowed to settle overnight. The precipitate was then separated from the mother liquor by centrifuging (attempted filtering, but the precipitate peptized and passed through the filter paper). The mother liquor weighed 4918 g. The precipitate was washed several times with cold water; but as the number of washes increased, the ability to centrifuge the slurry decreased substantially. The precipitate was air dried at room temperature for several days. The precipitate, antimony pentoxide, weighed 100 g and represented a recovered yield of 96.6%.

B INVENTIVE EXAMPLE - Antimonic Acid Prep. II

Sixty-nine milliliters of distilled water was discharged into a five liter three-neck flask equipped with agitator, thermocouple, water condenser, and an argon back bubbler. The flask was then placed in an ice-water bath. With agitation, 69 ml (161.2 g) of antimony pentachloride was slowly added (dropwise) to the flask. After a 2 ml addition, a white precipitate formed but redissolved as the antimony pentachloride addition continued. The reaction was violent and exothermic, but was controlled with the ice-water bath. After the antimony pentachloride addition was complete, additional distilled water was added until the flask's volume was 4600 ml (a thick white precipitate formed after approximately 300 ml of distilled water had been added). With slow agitation, the slurry was heated to and held at reflux for 76.5 hours. The slurry was cooled to room temperature and transferred into a five liter separatory funnel, where the precipitate was allowed to settle for thirteen days. The precipitate was separated from the mother liquor by centrifuging. The mother liquor weighed 4463 g. The precipitate was washed once with cold distilled water, then air dried at room temperature for several days. The precipitate, antimony pentoxide, weighed 100 g and represented a recovered yield of 93.8%.

C. INVENTIVE EXAMPLE - Supported Antimonic Acid

Prep III

About 50 ml of antimony (V) pentachloride was added to 50 grams of Amberlite ™ IRA-900C OH$^{31}$-form anion exchange resin. Argon was passed over to dry the mixture. Concentrated ammonium hydroxide (250 ml) was added slowly to the mixture at room temperature. After four days of stirring, about 850 ml of distilled water was added and the solution was refluxed (105°–110° C.) for three days, then filtered. The solid was washed with water, then air dried. Product weight was about 85 grams.

Prep IV

This preparation is similar to that described in Prep III. About 20 ml of concentrated NH40H was added very slowly to 80 ml of antimony (V) pentachloride.

About 15 grams of Amberlite ™ IRA-900C (OH$^-$-form) was added, resulting in a thick slurry. Additional ammonia (200 ml) and water (150 ml) were added to the slurry to reduce viscosity. Another 30 grams of the resin and 400 ml ammonia were added prior to heating and stirring the mixture for 2 hours at 80° C. The mixture was dried in air, reslurried with 950 ml water, refluxed (105° C.) for two days, and filtered. The air dried material was 195 grams.

Prep V

Antimony pentachloride (100 ml) was added to 50 grams of γ-alumina spheres with surface area of 220 m$^2$/gram. Argon was passed over the slurry overnight. About 500 ml of concentrated ammonia and 900 ml of water were added, and the mixture was refluxed for three days. The exchanger was dried in the oven at 110° C., and the dry weight was 195 grams.

Prep VI

About 150 ml of antimony (V) pentachloride was added to 55 grams of $SiO_2$-$Al_2O_3$. The mixture was stirred at room temperature for two days. Ammonia (36%, 250 ml) was added very slowly, followed by 750 ml of water. The solution was refluxed for 1½ hours and filtered. The solid was dried in the oven at 110° C. for 24 hours. The resulting product weighed 255 grams.

Prep VII

Ninety-seven milliliters of distilled water was charged into a 5 liter three-necked flask equipped with agitator and a water condenser. The flask was then placed in an ice-water cooling bath. With very slow agitation, 71 ml (165.9 g) of antimony (V) pentachloride was slowly added (dropwise) to the flask. After a 1–2 ml addition, a white precipitate formed but redissolved as the antimony (V) pentachloride addition continued. The hydrolyzed antimony (V) pentachloride was viscous and pale yellow in color. Next, 90 ml of Dowex ™ MWA-1 resin was added to the hydrolyzed antimony (V) pentachloride and allowed to age for three days at room temperature under an argon sparge to blow off the generated HCl and excess water. After the aging period, additional distilled water was added until the flask's volume was 4600 ml. After adding ~300 ml of $H_2O$, a white precipitate formed. The slurry was then aged for several months before filtration. The solid was dried in the oven at 110° C. for 24 hours. Dry weight was 127 grams.

II X-RAY POWDER DIFFRACTION

The X-ray powder diffraction patterns for Prep I, Prep II, Prep VII, and Polyantimonic Acid were obtained. A listing of X-ray powder data from M. Abe (1), Baetsle and Huys (2), and Prep I, Prep II, Prep VII (supported antimonic acid), and Atomergic polyantimonic acid is given in Table 1. Sources of X-ray powder data are also identified in Table 1.

Prep I was prepared according to a modification of the method described by Abe and Ito which involves aging at 40° C. for twelve days, but without prior acidification, whereas Prep II was made crystalline by refluxing for three days. A comparison of the X-ray patterns of Prep I and that prepared by Abe and Ito show exact matching of the d-spacings. However, Prep I has lesser intensity of peaks, an indication of lesser crystallinity vis-a-vis Abe's sample which exactly corresponds to the X-ray data in the A.S.T.M. X-ray diffraction pattern file. Prep II is similar to Prep I but of higher crystallinity as shown by the increased peak heights. However, Prep II was synthesized by refluxing at about 105° C. for at least three days. It can be concluded, therefore, that increased crystallinity of antimonic acid can be achieved not only by aging for a minimum of seven days, but also by refluxing for at least three days. A comparison of Prep II and Abe's X-ray data show the same reflections; however, it is more similar to Abe's crystalline antimonic acid that was heat-treated at 100° C. (Japanese Pat. No. 52-6949, 1979).

Polyantimonic acid obtained from Atomergic Chemetals, does not exhibit an X-ray pattern identical to the polyantimonic acid reported by Baetsle and Huys. It peaks are slight shifted to lower d-spacings as compared top the X-ray data of Abe and Ito and crystalline antimonic acids of Prep I and Prep II. Its pattern is similar to that of Prep II except for a reversal in the peak intensities of the 311 and 222 peaks. In Prep II the 222 peak is the stronger peak, whereas in the Atomergic polyantimonic acid the 311 peak is the stronger peak.

The X-ray pattern of Prep VII, a Dowex MWA-1 supported antimonic acid showed only four peaks of which the 222 peak is the strongest.

Antimonic acid samples from Prep I, Prep II, supported antimonic acid, and polyantimonic acid, were evaluated in an extensive series of tests involving different process variables such as pH, time, temperature, etc. The results are reported as follows.

III VARIATION IN PH

Initial tests were conducted on a dilute LiCl brine (1.4 wt %) to determine the best possible working pH range. The analysis of the test brines, listed as initial LiCl, and the test results are presented in Table 2. From the data, a pH working range from 11-12 gave the optimum removal of sodium. Thus, subsequent tests were done at pH=11-12 since a high pH enhances the exchange of H+ for Na+. A drop in pH was observed after exchange, as was evident at initial pH of 2.8 and 8.6; final pH values were 2.0 (No. 2) and 2.4 (No. 4), respectively, an indication of H+ release with Na+ uptake. The presence of more hydroxyl ions (Example No. 4) at pH=11-12 favors the removal of more H+ from within the bulk of the ion exchanger to provide more exchangeable sites for Na+; thus, resulting in increased Na+ removal (~99%).

An increase in the distribution coefficient, $K_d$, was also observed with increase in pH. This is obtained by using the equation:

$$K_d = \frac{\text{Amount of metal ions in exchanger}}{\text{Amount of metal ions in solution}} \times \frac{\text{ml solution}}{\text{g exchanger}}$$

Data reported herein have been obtained using the ICP (inductively coupled plasma spectroscopy) technique.

As reported by Abe, antimonic acid also has a high affinity for Ca and a lower affinity for K as shown in this instance and in subsequent tests.

IV VARIATION IN ALKALINITY

The ratio of antimonic acid and the amount of lithium hydroxide added to increase the pH to 11 to 12 was varied from 0.05 to 2.0 grams of LiOH H2O per 100 ml of 26 weight percent lithium chloride brine. The results are set forth in Table 3. An increase in sodium uptake was observed by addition of 0.05 grams LiOH H2O per 100 milliliters from 12% to 41%, see Examples 7 and 8, and from 70% to 85%, see Examples 15 and 16. A ratio of 10 for antimonic acid: lithium hydroxide monohydrate is the minimum required for increasing the sodium uptake.

Soluble antimony did not change significantly by addition of lithium hydroxide monohydrate; that is, with an initial antimony value of 3.2 ppm (Example No. 7) and 3.8 ppm (Example No. 15), the final antimony values ranged from 2.0 to 4.3 ppm (Example Nos. 8-14) and 2.6 to 6.6 ppm (Example Nos. 16-18).

A calcium reduction from 5 ppm to <0.1 ppm was also observed, corresponding to about 98% calcium removal. Very little potassium was exchanged.

V VARIATION IN CONTACT TIME AND TEMPERATURE

A. 1.4 wt % LiCl

The effect of contact time was evaluated for 1.4 wt % LiCl (pH=11-12) at room temperature. The results (Table 4) show an increase in Na+ uptake with increasing contact time up to 24 h. Prep I and Prep II crystalline antimonic acids have about 99% Na+ removal after 24 h contact time.

B. 26 Wt % LiCl

For 26 wt % LiCl (pH=11-12) contact times of 1, 5, and 24 h were studied at room temperature and 70°-73° C. These results are reported hereafter.

1. Room Temperature, 1 Hour

The results for 1 h contact time at room temperature show that Prep I and Prep II C-SbA and polyantimonic acid have the same sodium uptake (Table 5). An increase in sodium uptake with an increase in the amount of exchanger was also observed. Soluble antimony increased slightly; i.e., from ~1 ppm initially to about 1.2-2.6 ppm after exchange. An expected increase in soluble Sb was also noted for each increase in the amount of antimonic acid used. Calcium was reduced from 6-7 ppm to <0.1 ppm in the brine. No potassium uptake was observed. All three exchangers, crystalline antimonic acid (Prep I and Prep II), and polyantimonic acid, behaved very similarly in their ability to remove Na from LiCl brine.

2. 73±1° C. 1 Hour

An increase in temperature to 73° C. resulted in a slight increase in Na+ uptake but with a concurrently greater amount of soluble antimony in the brine. Calcium and potassium uptakes did not change. The data are tabulated in Table 6.

3. Room Temperature. 5 Hours

An increase in contact time from 1 h to 5 h exhibited a slight increase in Na uptake for the 1 g exchanger but similar uptake for the 2 g and 5 g exchangers (Prep I, Prep II, and polyantimonic acid). These results are given in Table 7. Soluble Sb in all tests ranged in values <1 to 5. Calcium removal was ≧91%; no K was exchanged.

4. 73±1° C. 5 Hours

An increase in reaction temperature from 25° C. to 73° C. did not affect the Na uptake of Prep I, Prep II, and polyantimonic acid. An increase in the amount of dissolved antimony was observed after exchange for all the exchangers when compared with those done at room temperature. Calcium removal was ≧92%; K removal was minimal. The data is given in Table 8.

5. Room Temperature, 24 Hours

The ion exchange behavior of Prep I, Prep II, and polyantimonic acid was unchanged by an increase in contact time from 5 h to 24 h at room temperature. Calcium removal was >99%; K removal was zero or very little. Soluble Sb ranged in values from <1-13 ppm after exchange. These results are tabulated in Table 9.

Sodium removal versus contact time at room temperature for 26 wt % LiCl is illustrated for polyantimonic acid in Examples 30-32, 48-50 and 66-68. Equilibrium is reached in around 24 hours.

VI BATCH TESTS ON LITHIUM HYDROXIDE BRINE

As can been seen from the data in Table 10, crystalline antomonic acid exhibited favorable sodium removal from 9.52 weight percent lithium hydroxide. About 99% of the sodium was removed from use of a 5 gram amount of the exchanger on a 200 milliliter aliquot of the brine at room temperature and a 24 hour contact time. Calcium removal was 23%, some potassium was also exchanged and residual antimony ranged from 3 to 27 parts per million.

VII FURTHER ILLUSTRATIONS

The invention is further illustrated by the following examples selected from the tables to provide guidance in use of the exchangers.

EXAMPLE 29

Five grams of crystalline antimonic acid were contacted with a 200 ml solution of a 26 wt % lithium chloride brine (pH=11-12) containing initial concentrations of 166 ppm Na, 31 ppm K, 6 ppm Ca, and <1 ppm Sb. After one hour stirring at room temperature, the solution was filtered. Filtrates analyzed 1.2 ppm Na, 30 ppm K, <0.1 ppm Ca, and 1.6 ppm Sb. This corresponds to >99% Na removal and 98% Ca removal.

EXAMPLE 31

Five grams of polyantimonic acid were contacted at room temperature for one hour with a 200 ml solution of 26 wt % lithium chloride brine (pH=11-12) containing initial concentrations of 179 ppm Na, 30 ppm K, 7 ppm Ca, and 1 ppm Sb. Filtrates analyzed 2.2 ppm Na, 30 ppm K, <0.1 ppm Ca, and 1.7 ppm Sb. This corresponds to 99% Na removal and 99% Ca removal.

EXAMPLE 47

A solution mixture (pH=11-12) of 5 grams of Prep II and 200 ml of 26 wt % LiCl brine was prepared. Stirring time was five hours at room temperature. Initial concentrations were 225 ppm Na, 31 ppm K, 11 ppm Ca, and <1 ppm Sb. Final concentrations after treatment with crystalline antimonic acid were 3 ppm Na, 27 ppm K, <1 ppm Ca, and 2 ppm Sb.

EXAMPLE 50

A solution mixture (pH=11-12) of 5 grams of polyantimonic acid and 200 ml of 26 wt % LiCl brine was prepared. Initial concentrations were 166 ppm Na, 31 ppm K, 6 ppm Ca, and <1 ppm Sb. After five hours contact at room temperature, the resulting filtrates analyzed 1.1 ppm Na, 31 ppm K, <0.1 ppm Ca, and 1.8 ppm Sb. This corresponds to 99% Na and Ca removal.

EXAMPLE 56

Five grams of crystalline antimonic acid were contacted with a 26 wt % lithium chloride brine, 200 ml, pH=11-12, at 73° C. for five hours. Initial concentrations were 221 ppm Na, 36 ppm K, 12 ppm Ca, and 4 ppm Sb. Resulting final concentrations were 5 ppm Na, 31 ppm K, <1 ppm Ca, and 27 ppm Sb. This corresponds to 98% Na removal and 92% Ca removal.

EXAMPLE 65

A solution mixture (pH=11-12) of 5 grams of Prep II and 200 ml of 26 wt % LiCl brine was prepared. Contact time was 24 hours at room temperature. Initial concentrations were 179 ppm Na, 30 ppm K, 7 ppm Ca, and 1 ppm Sb. Final concentrations were 1 ppm Na, 27 ppm K, <1 ppm Ca, and 10 ppm Sb.

EXAMPLE 68

A 200 ml solution (pH=11-12) of 26 wt % LiCl brine was contacted with 5 grams of polyantimonic acid for 24 hours at room temperature. Initial concentrations were 179 ppm Na, 30 ppm K, 7 ppm Ca, and 1 ppm Sb. Final concentrations after exchange were 2 ppm Na, 27 ppm K, <1 ppm Ca, and 9 ppm Sb. This is equivalent to 99% Na and Ca removal by polyantimonic acid.

EXAMPLE 72

A 26 wt % LiCl brine (200 ml, pH=11.2) containing 180 ppm of Na was contacted with polyantimonic acid (2 g) for 24 hours at room temperature. The resulting filtrate contained 4 ppm Sb and 1.1 ppm Na, corresponding to 99.4% Na removal. The exchanger was regenerated with 3N-NH4Cl in 1N-HCl followed by 0.05N-HCl. Reuse of this exchanger in fresh LiCl brine containing 117 ppm Na resulted in 98.2% Na removal (2 ppm) and 4 ppm Sb. The exchanger was then again regenerated, contacted with LiCl, and the resulting brine gave 94.9% Na removal and 2.3 ppm Sb. After a third regeneration, the exchanger was again contacted with LiCl. The filtrate gave 87.2% Na removal and 2.5 ppm Sb.

EXAMPLE 73

A similar experiment as in Example 72 was performed. A 26 wt % LiCl brine (200 ml, pH=11-12) containing 240 ppm Na and 34 ppm Ca initially was contacted with polyantimonic acid for 24 hours at room temperature. The resulting filtrate contained 14 ppm Na, 0.9 ppm Ca, and 18 ppm Sb. The exchanger was then regenerated with 3N-NH4Cl in 1N-HCl followed by 0.05N-HCl. The regenerant contained 217 ppm Na (96.0% Na regenerated) and 7.7 ppm Ca. The exchanger was then contacted with another 200 ml aliquot of LiCl brine resulting in a filtrate that contained 4 ppm Na (98.3% Na removal), <1 ppm Ca, and 4 ppm Sb. Regeneration gave 97.1% Ca and 34.8% Na regenerated. A third recycle with LiCl resulted in 76.7% Na removal, 99.4% Ca removal, and 3.4 ppm Sb. Regeneration was complete for Na and Ca. A fourth cycle using LiCl brine gave 85.4% Na removal, 100% Ca removal, and 2.9 ppm Sb.

VIII BATCH TEST ON SUPPORTED ANTIMONIC ACID

EXAMPLE 74

A five gram sample of the exchanger supported on Amberlite TM IRA-900C (Prep III) was contacted with 200 ml of 26 wt % lithium chloride brine (pH=11-12) at room temperature for 24 hours. The initial concentrations were 166 ppm Na, 31 ppm K, 6 ppm Ca. The final concentrations were 3 ppm Na, 28 ppm K, <1 ppm Ca.

EXAMPLE 75

A five gram sample of the exchanger supported on Amberlite TM IRA-900C (Prep IV) was stirred with 200 ml of 26 wt % lithium chloride brine containing initially 166 ppm Na, 31 ppm K, and 6 ppm Ca. After a contact time of 24 hours at room temperature, the resulting filtrates contained 6 ppm Na, 29 ppm K, <1 ppm Ca.

EXAMPLE 76

A five gram sample of the exchanger prepared according to Prep V was contacted with 200 ml of 26 wt % lithium chloride brine (pH=11–12) initially containing 166 ppm Na, 31 ppm K, and 6 ppm Ca. After 24 hours at room temperature, the filtrate analyzed 2 ppm Na, 29 ppm K, and <1 ppm Ca.

EXAMPLE 77

About 5 grams of the exchanger prepared according to Prep VI was contacted with 200 ml of 26 wt % lithium chloride brine at pH=11–12 for 24 hours at room temperature. Initial brine analyses showed 166 ppm Na, 31 ppm K, and 6 ppm Ca. Final filtrates were 4 ppm Na, 29 ppm K, and <1 ppm Ca.

EXAMPLE 78

Five grams of the exchanger prepared according to Prep VII was contacted with 200 ml of 26 % lithium chloride at pH=11–12 for 24 hours at room temperature. Initial brine analyses gave 166 ppm Na, 31 ppm K, and 6 ppm Ca. Final concentration after treatment were 7 ppm Na, 28 ppm K, and <1 ppm Ca.

IX COLUMN TEST ON SUPPORTED ANTIMONIC ACID - PREP VII

EXAMPLE 79

A column (29.2×1.5 cm) containing antimonic acid supported on a Dower NWA-1 (Prep VII) was prepared. Exchanger wet volume was 51.6 ml. Lithium chloride (28.9 wt % p=1.179 g/ml, pH=11.3) containing 180 ppm Na was passed through the column at a flow rate of 11 ml/min at room temperature. Two hundred ml aliquot samples were taken. After 1000 ml, Na was 4 ppm in the brine. The exchanger was then regenerated with 2.6 L of 3N $NH_4Cl$ in 1N HCl at a flow rate of 15 ml/min. A 0.05N HCl wash was passed through the column before passing fresh 26% brine again (pH=11.1, Na=174 ppm, flow rate=8 ml/min). About 2.4 L of brine was passed before breakthrough occurred (Na=3 ppm).

X PARTICLE SIZE ANALYSES

The particle size of the support materials can range in particle size from about 6.3 mm (0.25 in) down to about 150 μm. Unsupported crystalline antimonic can be prepared with a particle size largely greater than 212 μm (70 mesh) by either the Prep I or Prep II processes. Thus, a wide range of supported and unsupported ion exchangers can be prepared by the processes of this invention.

TABLE 1

X-Ray Powder Diffraction Data for Antimonic Acid

| | A.S.T.M. | | Abe C-SbA (1) | | Prep I Modified Abe Method | | Prep II Reflux Method | | Baetsle & Huys (2) Polyantimonic Acid | | Atomergic Polyantimonic Acid | | Abe 100 C (3) | | Prep VII Antimonic Acid | |
|---|---|---|---|---|---|---|---|---|---|---|---|---|---|---|---|---|
| h k l | d (A) | I/I | d (A) | I/I | d (A) | I/I | d (A) | I/I | d (A) | I/I | d (A) | I/I | d (A) | I/I | d (A) | I/I |
| 1 1 1 | 5.985 | 100 | 5.985 | 100 | 6.00 | 100.0 | 6.00 | 100.0 | 5.831 | 100 | 5.97 | 100 | 5.991 | 100 | 6.25 | 69.0 |
| 3 1 1 | 3.128 | 70 | 3.128 | 70 | 3.13 | 49.3 | 3.13 | 59.7 | 3.097 | 62–70 | 3.11 | 60.6 | 3.128 | 51 | 3.117 | 17.6 |
| 2 2 2 | 2.995 | 75 | 2.995 | 75 | 3.00 | 52.8 | 2.99 | 61.7 | 2.957 | 62–70 | 2.98 | 54.8 | 2.996 | 63 | 2.977 | 100 |
| 4 0 0 | — | — | 2.594 | 15 | 2.60 | 10.7 | 2.59 | 14.9 | 2.569 | 14–17 | 2.58 | 9.3 | 2.594 | 14 | — | — |
| 3 3 1 | — | — | 2.381 | 11 | 2.38 | 4.6 | 2.37 | 6.5 | 2.355 | 10–13 | 2.36 | 5.8 | 2.378 | 11 | — | — |
| 5 1 1 | — | — | 1.998 | 17 | 1.99 | 9.9 | 1.99 | 11.8 | 1.981 | 14–18 | 1.985 | 12.4 | — | — | — | — |
| 4 4 0 | 1.836 | 31 | 1.835 | 31 | 1.83 | 17.9 | 1.83 | 19.4 | 1.822 | 31–36 | 1.825 | 20.7 | 1.834 | 19 | 1.81 | 10.5 |
| 5 3 1 | — | — | 1.754 | 22 | 1.75 | 12.2 | 1.75 | 12.4 | 1.741 | 22–23 | 1.745 | 12.7 | 1.753 | 13 | — | — |
| 5 3 3 | — | — | 1.583 | 11 | 1.58 | 4.1 | 1.58 | 4.5 | — | — | 1.64 | 4.7 | 1.583 | 6 | — | — |
| 6 2 2 | 1.565 | 24 | 1.565 | 24 | 1.56 | 10.7 | 1.56 | 13.5 | 1.555 | 22–29 | 1.55 | 14.3 | 1.564 | 16 | — | — |

(1) Abe, M.; Ito, T. Bull. Chem. Soc. Jan. 1968, 41, 333–342
(2) Baetsle, L. H.; Huys, D. J. J. Inorg. Nucl. Chem. 1968, 30, 639–649
(3) Abe, M.; Ito, T. J. Inorg. Nucl. Chem. 1980, 42 1641–1644

TABLE 2

Ion Exchange Data for Antimonic Acid: Room Temperature and 24 Hours Contact Time per 200 ml Aliquot of 1.4 Wt. % Lithium Chloride at Varied pH

| Ex. No. | Sb Acid | Amount (g) | Initial pH | Final pH | Log $K_d$ | Na (ppm) | Ca (ppm) | Removal % Na | % Ca |
|---|---|---|---|---|---|---|---|---|---|
| | Initial LiCl | — | 2.8 | 2.8 | | 282 | 11 | — | — |
| 1 | Prep I | 1.0 | 2.8 | 2.1 | 2.57 | 98 | <1 | 65 | >91 |
| 2 | Prep II | 1.0 | 2.8 | 2.0 | 2.69 | 82 | <1 | 71 | >91 |
| | Initial LiCl | — | 8.6 | 8.6 | | 277 | 11 | — | — |
| 3 | Prep I | 1.0 | 8.6 | 2.5 | 2.61 | 91 | <1 | 67 | >91 |
| 4 | Prep II | 1.0 | 8.6 | 2.4 | 2.74 | 74 | <1 | 73 | >91 |
| | Initial LiCl | — | 11.8 | 11.8 | | 274 | 9 | — | — |
| 5 | Prep I | 1.0 | 11.8 | 11.7 | 4.26 | 3 | <1 | 99 | 89 |
| 6 | Prep II | 1.0 | 11.8 | 11.7 | 4.44 | 2 | <1 | 99 | 89 |

TABLE 3

Ion Exchange Data for Antimonic Acid: Room Temperature and 1 Hour Contact Time per 200 ml Aliquot of 25.6 Wt. % Lithium Chloride and Varied Ratios of Antimonic Acid and Lithium Hydroxide Monohydrate

| Ex. No. | Sb-Acid | Amount (g) | LiOH H$_2$O (g/100 ml) | Ratio = $\frac{\text{Sb-acid}}{\text{LiOH H}_2\text{O}}$ | Na (ppm) | K (ppm) | Ca (ppm) | Sb (ppm) | Removal % Na | % K | % Ca |
|---|---|---|---|---|---|---|---|---|---|---|---|
| 7 | Polyan (1) | 1.0 | 0 | | 70 | 39 | <0.1 | 3.2 | 12 | 2.5 | 98 |
| 8 | | 1.0 | 0.05 | 10 | 47 | 39 | <0.1 | 4.3 | 41 | 2.5 | 98 |
| 9 | | 1.0 | 0.10 | 5 | 47 | 39 | <0.1 | 3.8 | 41 | 2.5 | 98 |
| 10 | | 1.0 | 0.25 | 2 | 50 | 39 | <0.1 | 2.3 | 38 | 2.5 | 98 |
| 11 | | 1.0 | 0.52 | 0.96 | 51 | 40 | <0.1 | 2.0 | 36 | 0 | 98 |
| 12 | | 1.0 | 0.75 | 0.67 | 50 | 39 | 0.3 | 2.1 | 38 | 2.5 | 94 |
| 13 | | 1.0 | 1.00 | 0.50 | 50 | 39 | 0.1 | 2.1 | 38 | 2.5 | 98 |
| 14 | | 1.0 | 2.00 | 0.52 | 53 | 38 | <0.1 | 3.4 | 34 | 5.0 | 98 |
| 15 | Polyan | 2.0 | 0 | | 24 | 37 | <0.1 | 3.8 | 70 | 7.5 | 98 |
| 16 | | 2.0 | 0.10 | 10 | 12 | 39 | <0.1 | 6.6 | 85 | 2.5 | 98 |
| 17 | | 2.0 | 0.50 | 2 | 14 | 39 | <0.1 | 2.8 | 82 | 2.5 | 98 |
| 18 | | 2.0 | 2.00 | 0.5 | 16 | 39 | 0.4 | 2.6 | 85 | 2.5 | 92 |
| | Initial LiCl | | | | 80 | 40 | 5 | 1.6 | | | |

(1) Polyan = polyantimonic acid commercially available from Atomergic Chemicals

TABLE 4

Ion Exchange Data for Antimonic Acid: Varied Contact Times at Room Temperature per 200 ml Aliquot of 1.4 Wt. % Lithium Chloride at pH = 11-12

| Ex. No. | Sb—Acid | Amount (g) | Contact Time (h) | Na (ppm) | K (ppm) | Ca (ppm) | Removal % Na | % K | % Ca | Na Loading (meq/g) |
|---|---|---|---|---|---|---|---|---|---|---|
| 19 | Prep I | 1.0 | ½ | 96 | 29 | <1 | 68 | 34 | >88 | 1.75 |
| 20 | | 1.0 | 3 | 42 | 28 | <1 | 86 | 36 | >88 | 2.22 |
| 21 | | 1.0 | 5 | 29 | 29 | <1 | 90 | 34 | >88 | 2.33 |
| 22* | | 1.0 | 24 | 3 | 30 | <1 | 99 | 27 | >89 | 2.36 |
| 23* | Prep II | 1.0 | 24 | 2 | 28 | <1 | 99 | 32 | >89 | 2.36 |
| | Initial LiCl | | | 297 | 44 | 8 | | | | |
| | *Initial LiCl | | | 274 | 41 | 9 | | | | |

TABLE 5

Ion Exchange Data for Antimonic Acid: Room Temperature and 1 Hour Contact Time per 200 ml Aliquot of 26 Wt. % Lithium Chloride (pH = 11-12)

| Ex. No. | Sb—Acid | Amount (g) | Na (ppm) | K (ppm) | Ca (ppm) | Sb (ppm) | Removal % Na | % K | % Ca | Na Loading (meq/g) |
|---|---|---|---|---|---|---|---|---|---|---|
| 24 | Prep I | 1.0 | 36 | 33 | <0.1 | 1.3 | 78 | 0 | 98 | 1.13 |
| 25 | Prep I | 2.0 | 13.3 | 34 | <0.1 | 1.3 | 92 | 0 | 98 | 0.66 |
| 26 | Prep I | 5.0 | 1.5 | 33 | <0.1 | 2.6 | 99 | 0 | 98 | 0.29 |
| 27 | Prep II | 1.0 | 44 | 33 | <0.1 | 1.2 | 73 | 0 | 98 | 1.06 |
| 28 | Prep II | 2.0 | 8.7 | 33 | <0.1 | 1.3 | 95 | 0 | 98 | 0.68 |
| 29 | Prep II | 5.0 | 1.2 | 30 | <0.1 | 1.6 | 99 | 0 | 98 | 0.29 |
| 30* | Polyan | 1.0 | 53 | 31 | <0.1 | 1.2 | 70 | 0 | 98 | 0.98 |
| 31* | Polyan | 2.0 | 16 | 31 | <0.1 | 1.3 | 91 | 0 | 98 | 0.71 |
| 32* | Polyan | 5.0 | 2.2 | 30 | <0.1 | 1.7 | 99 | 0 | 98 | 0.31 |
| | Initial LiCl | | 166 | 31 | 6 | <1 | | | | |
| | *Initial LiCl | | 179 | 30 | 7 | | | | | |

TABLE 6

Ion Exchange Data for Antimonic Acid: 73 ± 1 C and 1 Hour Contact Time per 200 ml Aliquot of 26 Wt. % Lithium Chloride (pH = 11-12)

| Ex. No. | Sb—Acid | Amount (g) | Na (ppm) | K (ppm) | Ca (ppm) | Sb (ppm) | Removal % Na | % K | % Ca | Na Loading (meq/g) |
|---|---|---|---|---|---|---|---|---|---|---|
| 33 | Prep I | 1.0 | 27 | 45 | 0.9 | 5.4 | 85 | 0 | 89 | 1.33 |
| 34 | Prep I | 2.0 | 4.2 | 44 | 0.8 | 11.2 | 98 | 0 | 90 | 0.76 |
| 35 | Prep I | 5.0 | 0.9 | 42 | 0.2 | 31.5 | 99.5 | 0 | 98 | 0.31 |
| 36 | Prep II | 1.0 | 22 | 44 | <0.1 | 3.4 | 88 | 0 | 99 | 1.37 |
| 37 | Prep II | 2.0 | 3.0 | 45 | <0.1 | 6.3 | 98 | 0 | 99 | 0.77 |
| 38 | Prep II | 5.0 | 0.8 | 42 | <0.1 | 16.4 | 99.6 | 0 | 99 | 0.31 |
| 39 | Polyan | 1.0 | 52 | 45 | <0.1 | 6.3 | 71 | 0 | 99 | 1.11 |
| 40 | Polyan | 2.0 | 7 | 43 | <0.1 | 11.2 | 96 | 0 | 99 | 0.75 |
| 41 | Polyan | 5.0 | 1.9 | 44 | <0.1 | 19.3 | 99 | 0 | 99 | 0.31 |
| | Initial LiCl | | 180 | 36 | 8.1 | <1 | | | | |

TABLE 7

Ion Exchange Data for Antimonic Acid: Room Temperature and 5 Hours Contact Time per 200 ml Aliquot of 26.6 Wt. % Lithium Chloride (pH = 11-12)

| Ex. No. | Sb—Acid | Amount (g) | Na (ppm) | K (ppm) | Ca (ppm) | Sb (ppm) | Removal % Na | Removal % K | Removal % Ca | Na Loading (meq/g) |
|---|---|---|---|---|---|---|---|---|---|---|
| 42 | Prep I | 1.0 | 48 | 31 | <1 | 1 | 79 | 0 | >91 | 1.54 |
| 43 | Prep I | 2.0 | 8 | 31 | <1 | — | 96 | 0 | >91 | 0.94 |
| 44 | Prep I | 5.0 | 2 | 28 | <1 | 5 | 99 | 10 | >91 | 0.39 |
| 45 | Prep II | 1.0 | 35 | 30 | <1 | <1 | 84 | 3 | >91 | 1.65 |
| 46 | Prep II | 2.0 | 3 | 29 | <1 | — | 99 | 6 | >91 | 0.96 |
| 47 | Prep II | 5.0 | 3 | 27 | <1 | 2 | 99 | 13 | >91 | 0.39 |
| 48* | Polyan | 1.0 | 34 | 31 | <0.1 | 1.1 | 80 | 0 | 98 | 1.15 |
| 49* | Polyan | 2.0 | 5.8 | 31 | <0.1 | 1.4 | 96 | 0 | 98 | 0.70 |
| 50* | Polyan | 5.0 | 1.1 | 31 | <0.1 | 1.8 | >99 | 0 | 98 | 0.30 |
| | Initial LiCl | | 225 | 31 | 11 | <1 | | | | |
| | *Initial LiCl | | 166 | 31 | 6 | <1 | | | | |

TABLE 8

Ion Exchange Data for Antimonic Acid: 73 ± 1 C and 5 Hours Contact Time per 200 ml Aliquot of 26.4 Wt. % Lithium Chloride (pH = 11-12)

| Ex. No. | Sb—Acid | Amount (g) | Na (ppm) | Ca (ppm) | Sb (ppm) | Removal % Na | Removal % Ca | Na Loading (meq/g) |
|---|---|---|---|---|---|---|---|---|
| 51 | Prep I | 1.0 | 55 | <1 | 13 | 75 | >92 | 1.44 |
| 52 | Prep I | 2.0 | 10 | <1 | — | 95 | >92 | 0.92 |
| 53 | Prep I | 5.0 | 2 | <1 | 46 | 99 | >92 | 0.38 |
| 54 | Prep II | 1.0 | 50 | <1 | 4 | 77 | >92 | 1.49 |
| 55 | Prep II | 2.0 | 11 | <1 | — | 95 | >92 | 0.91 |
| 56 | Prep II | 5.0 | 5 | <1 | 27 | 98 | >92 | 0.38 |
| 57* | Polyan | 1.0 | 34 | 0.1 | 10.0 | 81 | 99 | 1.27 |
| 58* | Polyan | 2.0 | 11 | 0.27 | 20.6 | 94 | 97 | 0.73 |
| 59* | Polyan | 5.0 | 1.5 | 0.15 | 50.2 | >99 | 98 | 0.31 |
| | Initial LiCl | | 221 | 12 | 4 | | | |
| | *Initial LiCl | | 180 | 8.1 | <1 | | | |

TABLE 9

Ion Exchange Data for Antimonic Acid: Room Temperature and 24 Hours Contact Time per 200 ml Aliquot of 26.2 Wt. % Lithium chloride (pH = 11-12)

| Ex. No. | Sb—Acid | Amount (g) | Na (ppm) | K (ppm) | Ca (ppm) | Sb (ppm) | Removal % Na | Removal % K | Removal % Ca | Na Loading (meq/g) |
|---|---|---|---|---|---|---|---|---|---|---|
| 60 | Prep I | 1.0 | 39 | 30 | <1 | 2 | 78 | 0 | >99 | 1.22 |
| 61 | Prep I | 2.0 | 7 | 30 | <1 | — | 96 | 0 | >99 | 0.75 |
| 62 | Prep I | 5.0 | 2 | 29 | <1 | 13 | 99 | 3 | >99 | 0.31 |
| 63 | Prep II | 1.0 | 28 | 30 | <1 | <1 | 84 | 0 | >99 | 1.31 |
| 64 | Prep II | 2.0 | 3 | 28 | <1 | — | 98 | 7 | >99 | 0.76 |
| 65 | Prep II | 5.0 | 1 | 27 | <1 | 10 | >99 | 10 | >99 | 0.31 |
| 66 | Polyan | 1.0 | 26 | 29 | <1 | <1 | 86 | 3 | >99 | 1.33 |
| 67 | Polyan | 2.0 | 3 | 29 | <1 | — | 98 | 3 | >99 | 0.76 |
| 68 | Polyan | 5.0 | 2 | 27 | <1 | 9 | 99 | 10 | >99 | 0.31 |
| | Initial LiCl | | 179 | 30 | 7 | — | | | | |

TABLE 10

Ion Exchange Data for Antimonic Acid: Room Temperature and 24 Hours Contact Time per 200 ml Aliquot of 9.52 Wt. % Lithium Hydroxide

| Ex. No. | Sb—Acid | Amount (g) | Na (ppm) | Ca (ppm) | Sb (ppm) | Removal % Na | Removal % Ca | Na Loading (meq/g) |
|---|---|---|---|---|---|---|---|---|
| 69 | Prep I | 1.0 | 321 | <1 | 3 | 50 | 92 | 2.74 |
| 70 | | 2.0 | 70 | <1 | — | 89 | 92 | 2.46 |
| 71 | | 5.0 | 6 | 2 | 27 | 99 | 83 | 1.10 |
| | Initial LiOH | | 636 | 12 | — | | | |

TABLE 11

Particle Size Analyses by ASTM E-11 Specification

| Sample | Sieve No. | % | Sample | Sieve No. | % |
|---|---|---|---|---|---|
| 1. Amberlite 900C—OH | +30 | 48.29 | 6. $SiO_3—Al_2O_3$ | +6 | 24.46 |
| | +35 | 22.30 | | +12 | 75.54 |
| | +40 | 15.73 | | +−12 | 0.00 |
| | +50 | 13.30 | | | |
| | −50 | 0.39 | 7. SbA on $SiO_2—Al_2O_3$ (Prep VI) | +4 | 71.07 |
| 2. SbA on Amberlite 900C—OH | +35 | 54.42 | | +6 | 7.16 |
| | +40 | 7.26 | | +8 | 6.68 |
| | | | | +12 | 4.89 |

TABLE 11-continued

| | Particle Size Analyses by ASTM E-11 Specification | | | | | |
|---|---|---|---|---|---|---|
| Sample | Sieve No. | % | | Sample | Sieve No. | % |
| (Prep III) | +50 | 10.67 | | | +14 | 2.13 |
| | +70 | 6.22 | | | +16 | 1.26 |
| | +100 | 5.41 | | | −16 | 6.81 |
| | +200 | 6.58 | | | | |
| | −200 | 9.44 | 8. | Dowex MWA-1 | +20 | 39.07 |
| | | | | | +30 | 53.02 |
| 3. SbA on Amberlite | +8 | 78.34 | | | +35 | 4.66 |
| 900C—OH | +12 | 6.26 | | | +40 | 1.66 |
| (Prep IV) | +14 | 3.16 | | | +50 | 1.47 |
| | +16 | 1.54 | | | −50 | 0.10 |
| | +18 | 2.07 | | | | |
| | +20 | 1.70 | 9. | SbA on Dowex | +35 | 85.0 |
| | −20 | 6.94 | | MWA-1 | +40 | 3.61 |
| | | | | (Prep VII) | +50 | 4.55 |
| 4 —Al$_2$O$_3$ | +30 | 0.09 | | | +70 | 2.34 |
| | +35 | 6.31 | | | +100 | 1.95 |
| | +40 | 31.32 | | | +200 | 1.56 |
| | +50 | 50.84 | | | −200 | 0.99 |
| | +70 | 10.58 | | | | |
| | +100 | 0.43 | 10. | SbA - Prep I | +70 | 68.03 |
| | −100 | 0.42 | | (Abe Method) | +100 | 8.16 |
| | | | | | +200 | 11.48 |
| 5. SbA on —Al$_2$O$_3$ | +35 | 29.27 | | | −200 | 12.33 |
| (Prep V) | +40 | 7.71 | | | | |
| | +50 | 19.36 | 11. | SbA - Prep II | +70 | 63.22 |
| | +70 | 11.57 | | (Reflux) | +100 | 11.07 |
| | +100 | 9.73 | | | +200 | 12.74 |
| | −100 | 22.36 | | | −200 | 12.97 |

I claim:

1. A method for removing at least 99% of the sodium ions from a natural or industrial brine containing dissolved salts of metals of Group 1A of the periodic chart wherein sodium ions are present but are not the predominant metal ions, comprising: contacting the brine at pH 11 to 12 with an ion exchanger selected from the group consisting of crystalline antimonic acid and polyantimonic acid for a period of time to permit ion exchange to occur, and separating of the ion exchanger from the brine with greater than 99% of the sodium ions removed.

2. The method of claim 1 wherein the brine is contacted with the ion exchanger for one to twenty-four hours.

3. The method of claim 1 using a brine having a temperature in the range of 20° C. to 80° C.

4. The method of claim 1 wherein contacting the brine with the ion exchanger is maintained by agitating the brine-ion exchanger mixture.

5. The method of claim 1 wherein the brine is selected from the group consisting of lithium chloride, lithium hydroxide, potassium chloride, rubidium chloride, and cesium chloride brines.

6. The method of claim 1 wherein the ion exchanger is a supported antimonic acid.

7. A method of claim 1 wherein the brine at pH 11 to 12 is contacted with crystalline antimonic acid prepared by impregnating a particulate ion exchange material selected from anion exchange resins, alumina and silica-alumina with antimony (V) pentachloride followed by hydrolyzing the antimony (V) pentachloride to form antimonic acid and refluxing the antimonic acid-particulate material for at least 24 hours to crystallize the antimonic acid.

8. A method of removing at least 99% of the sodium ions from a lithium chloride brine containing sodium ions comprising: contacting the brine at pH 11 to 12 with an ion exchanger selected from the group consisting of crystalline antimonic acid and polyantimonic acid, and separating of the ion exchanger from the brine with at least 99% of the sodium ions removed.

9. The method of claim 8 wherein the brine is contacted with the ion exchanger for one to twenty-four hours.

10. The method of claim 8 using a brine having a temperature in the range of 20° C. to 80° C.

11. The method of claim 8 wherein contacting the brine with the ion exchanger is maintained by agitating the brine-ion exchanger mixture.

12. A method for removing at least 99% of the sodium ions from a natural or industrial brine containing dissolved salts of metals of Group IA of the Periodic Chart of the Elements wherein sodium ions are present but are not the predominant metal ions, comprising: contacting the brine at pH 11 to 12 for at least one hour with a crystalline antimonic acid ion exchanger prepared by hydrolyzing antimony pentachloride to precipitate an antimonic acid slurry, which is heated at its reflux temperature for at least twenty-four hours to crystallize the antimonic acid, followed by separating the brine, with greater than 99% of the sodium ions removed from contact with the ion exchanger.

13. The method of claim 12 wherein the crystalline antimonic acid is formed by refluxing the mixture at the reflux temperature for a period of 24 hours to 7 days.

* * * * *